May 2, 1961  E. A. TAYLOR  2,982,898
CONTROL FOR ELECTRIC MOTOR
Filed March 28, 1957
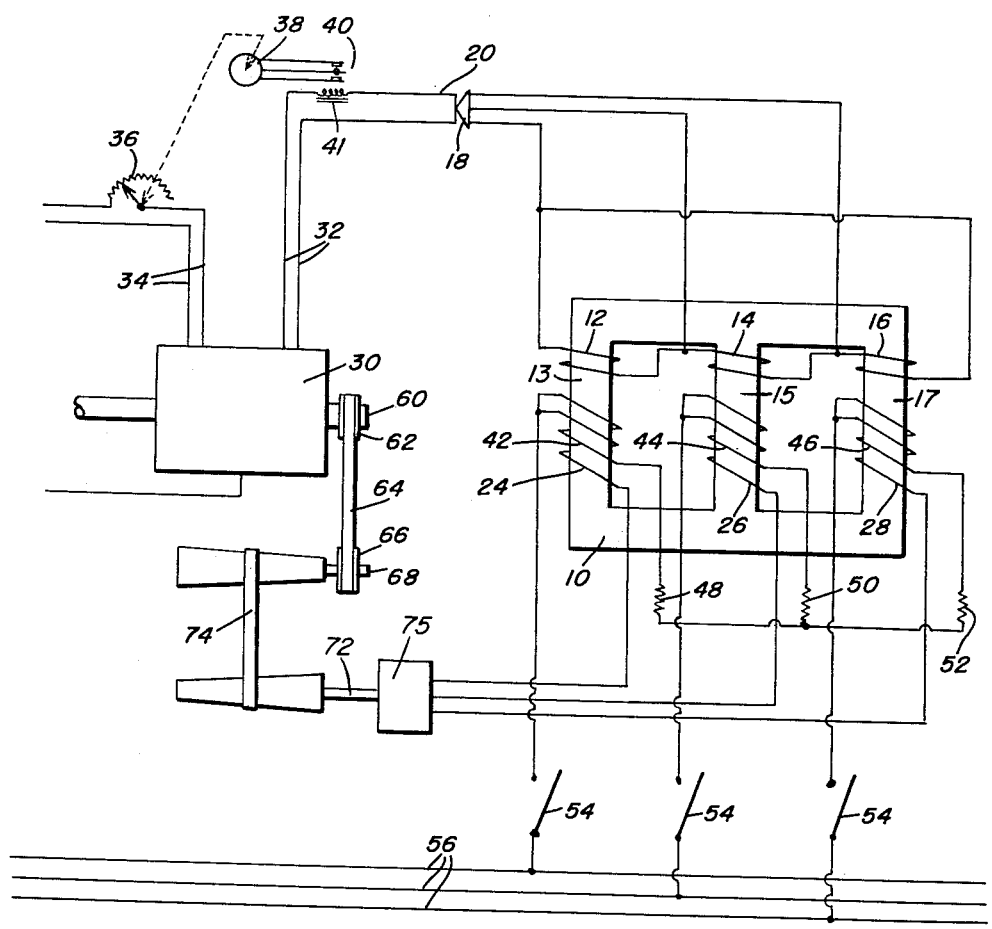
Edgar A. Taylor
INVENTOR.
BY *Clarence A. O'Brien*
*and Harvey B. Jacobson*
Attorneys United States Patent Office 2,982,898
Patented May 2, 1961

2,982,898

CONTROL FOR ELECTRIC MOTOR

Edgar A. Taylor, 105 Queen St., Thorold, Ontario, Canada

Filed Mar. 28, 1957, Ser. No. 649,179

4 Claims. (Cl. 318—77)

This invention relates to a control for electric motors and more particularly to an arrangement adapted to be used to control the speed of a paper machine.

In paper machine drives, it is of course necessary that the various drive motors of the various stages carry the paper thereby at identical speeds so as to prevent paper breakage. Accordingly, controls are necessary to ensure that the drive motors of the various stages have a common speed despite variations in torque of the individual motors. The control presented herein and presently in operation is utilized to control the speed of a paper machine where a constant speed drive is necessary over a plurality of sections. However, the following teachings could be used wherever motor speed control for any type driving equipment is necessary. The teachings of this invention are characterized by their simplicity and the control is particularly advantageous inasmuch as a small number of moving parts are utilized requiring less maintenance than equipment taught by the prior art. The control system is extremely sensitive to any slight speed variation in any section of the equipment being driven. The system, below disclosed, has a simplicity of a mechanical device and the accuracy of an electronic control. The paper drive systems of the prior art were arranged so that if one section of the series connected sections required more torque, the synchronous machine utilized therewith drew power from the other sections through the synchronous machine. Of course, the reverse was true; that is, if one section required less torque, then the synchronous machine associated therewith generated power for the other synchronous machines. With the following system, the synchronous machines of the various stages of the paper drive system are tied together to a common bus and of course are running at exactly the same speed. As the torque changes on any particular section, the synchronous machine associated therewith may retard or advance a few degrees of one cycle. In recent use, due to hot bearings in a particular paper drive section, the drive motor associated therewith was required to deliver 70% more torque. With prior art systems, the delivery of so much additional torque would have been impossible and the paper would have broken. With the control disclosed below, the extra torque required was delivered and the hot bearings were able to cool off until conditions returned to normal. There was no variation in the paper machine speed and no break in the paper.

These together with other objects and advantages which will become subsequently apparent reside in the details of construction and operation as more fully hereinafter described and claimed, reference being had to the accompanying drawing wherein is illustrated a schematic diagram of the electric motor control circuit comprising the invention.

With continuing reference to the drawing, the numeral 10 designates a transformer which is a three phase transformer with three windings for each phase. The phase legs are designated as 13, 15 and 17 and windings 12, 42, 24 and 14, 44, 26 and 16, 46, 28 are respectively carried on the phase legs. In use, the windings of the particular phase legs are positioned directly over each other for greatest economy of power factor. However, for purposes of clarity, the drawing does not show the superposed arrangement.

Windings 12, 14 and 16 are delta connected to a three phase full wave rectifier 18. Conductors 32 are fed from the rectifier 18 and are connected to a field coil of motor 30. Other field coils of motor 30 are energized through conductors 34 having a variable resistor 36 electrically connected therewith. The conductors 34, representing the leads to all of the field coils other than the field coil receiving current from conductors 32, are energized from an external source of power (not shown). An electromagnetic relay 40 has a coil 41 serially connected in the conductor 32 and controls a reversible motor 38 which in turn is connected to variable resistor 36.

The motor 30 is operatively connected to a synchronous machine 75 through belt 64 and pulley 62 journaled on shaft 60 and pulley 66 journaled on shaft 68. Also, belt 74 is driven by shaft 68 which in turn drives shaft 72 which is operatively connected to the synchronous machine 75.

Coils 24, 26 and 28 of the three phase transformer 10 are connected to the synchronous machine 75 as is illustrated in the drawing. The numeral 56 represents a buss common to the various paper drive sections and is electrically connected to windings 42, 44 and 46 through switches 54. The limiting resistors 48, 50 and 52 are serially connected with the windings 42, 44 and 46 as is illustrated.

The operation of the invention will now be considered. It is assumed that the arrangement illustrated in the drawing represents the circuity of any particular section of the paper drive system. As the D.C. drive motor 30 is started and brought up to synchronous speed, the synchronous machine 75 energizes the three phase transformer 10 through windings 42, 44 and 46 and the limiting resistors 48, 50 and 52. The output impressed on the windings 12, 14 and 16 is fed into the three phase full wave rectifier 18 through relay 41 and conductors 32 to one pole of the motor 30. At this stage, the field coil in the motor 30 will be energized about 50% and the transformer 10 about 30%. When the switches 54 are closed, the synchronous machine 75 of this section will be synchronized with synchronous machines of other sections connected to the common buss 56. Now, if the synchronous machine 75 is motoring, the current in the transformer windings 24, 26 and 28 will be approximately 180° out of phase with the current in windings 42, 44 and 46 and accordingly the one pole of motor 30 energized through conductors 32 will be energized less so as to give the motor 30 more torque. Conversely, when the synchronous machine 75 is generating, the current in the windings 24, 26 and 28 will be in phase with the current in windings 42, 44 and 46 and in turn the current in the one pole of the motor 30 energized through conductors 32 will be greater so as to give the motor less torque. In this manner, the synchronous machine 75 and associated driving belts and pulleys, are required to do only a fraction of the work of adjustment. The control arrangement illustrated in connection with relay 40 is tolerable so as to allow the synchronous machine 75 to either motor or generate a small amount. Therefore, the synchronous machine 75 will absorb any small torque change so as to hold its particularly associated section in step with the master section and other sections connected through the common buss 56 without utilizing the reversing control arrangement associated with relay 40. However, in the event that the torque change required is significant, the relay 40 will operate so as to control the variable resistor 36 to directly control the torque of the motor 30.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A speed control for an electric motor comprising a three phase transformer having three windings for each phase, one winding of each phase being connected to a three phase full wave rectifier, said rectifier being connected to a first field coil of an electric motor, said transformer including shunt windings connected to a source of power and to resistances for inducing an electromotive force in said one winding of each phase, said transformer including series windings connected to a synchronous machine, said synchronous machine being driven by said electric motor and being responsive to the speed of said electric motor, said electric motor having other field coils, a separate source of power for said other field coils connected thereto, and control means controlling the quantity of power from said separate source of power to said other field coils.

2. A speed control for an electric motor comprising a three phase transformer having three windings for each phase, one winding of each phase being connected to a three phase full wave rectifier, said rectifier being connected to a first field coil of an electric motor, said transformer including shunt windings connected to a source of power and to resistances for inducing an electromotive force in said one winding of each phase, said transformer including series windings connected to a synchronous machine, said electric motor having an output shaft, a pulley on said shaft, a cone pulley arrangement, an endless belt entrained about said pulley and said cone pulley arrangement, said synchronous machine being connected to and driven by said cone pulley arrangement and being responsive to the speed of said electric motor, said electric motor having other field coils, a separate source of power for said other field coils connected thereto, and control means controlling the quantity of power from said separate source of power to said other field coils.

3. The combination of claim 1 wherein said control means are electrically responsive to the current in said first field coil and include a variable resistor and a reversible motor operatively connected thereto.

4. The combination of claim 2 wherein said control means are electrically responsive to the current in said first field coil and include a variable resistor and a reversible motor operatively connected thereto.

References Cited in the file of this patent
UNITED STATES PATENTS

| | | |
|---|---|---|
| 1,763,199 | Staege | June 10, 1930 |
| 2,727,199 | Ogle | Dec. 13, 1955 |
| 2,743,405 | King et al. | Apr. 24, 1956 |